J. E. HUTZEN.
ROLL MACHINE FOR REDUCING CEREALS TO FILAMENTOUS FORM.
APPLICATION FILED AUG. 24, 1915.

1,168,075.

Patented Jan. 11, 1916.
3 SHEETS—SHEET 1.

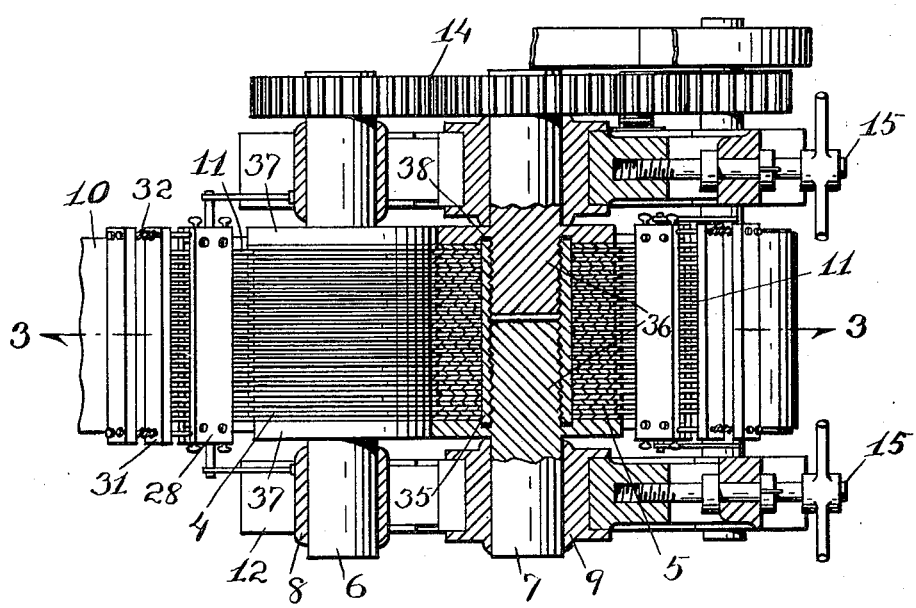
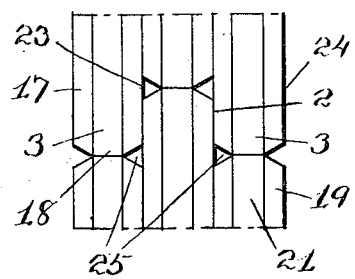
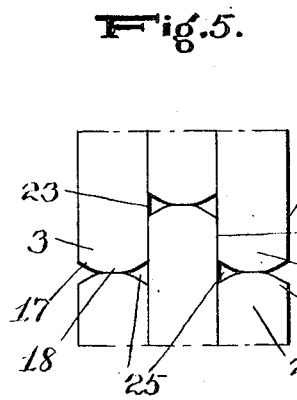

J. E. HUTZEN.
ROLL MACHINE FOR REDUCING CEREALS TO FILAMENTOUS FORM.
APPLICATION FILED AUG. 24, 1915.

1,168,075.

Patented Jan. 11, 1916.
3 SHEETS—SHEET 3.

Witness
Stuart Fielder.

Inventor
John E. Hutzen
E. W. Anderson & Son
his Attorneys

By

UNITED STATES PATENT OFFICE.

JOHN E. HUTZEN, OF PITTSBURGH, PENNSYLVANIA.

ROLL-MACHINE FOR REDUCING CEREALS TO FILAMENTOUS FORM.

1,168,075.      Specification of Letters Patent.      Patented Jan. 11, 1916.

Application filed August 24, 1915. Serial No. 47,176.

*To all whom it may concern:*

Be it known that I, JOHN E. HUTZEN, a citizen of the United States, resident of Pittsburgh, in the county of Allegheny and State of Pennsylvania, have made a certain new and useful Invention in Roll-Machines for Reducing Cereals to Filamentous Form; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
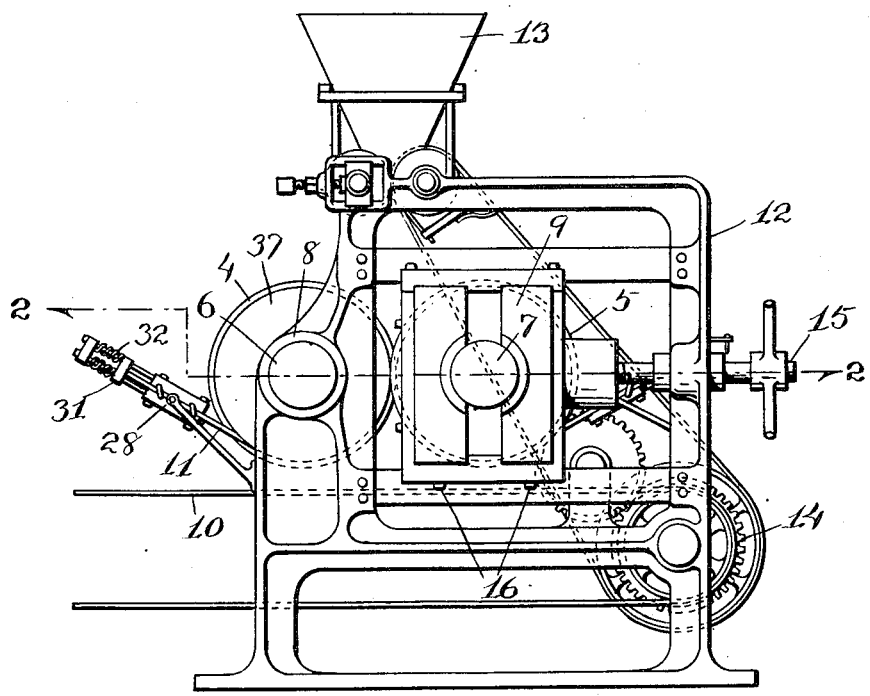
Figure 3:
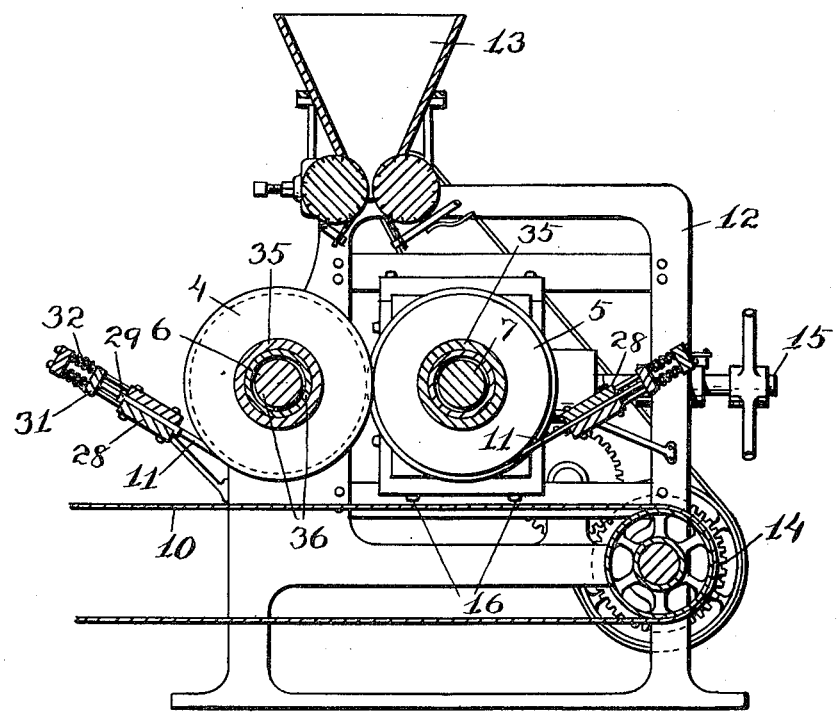

Figure 1 is a side view of the invention. Fig. 2 is a section on the line 2—2, Fig. 1. Fig. 3 is a section on the line 3—3. Fig. 2. Fig. 4 is a detail fragmentary plan view of the disks. Fig. 5 is a similar view of modified disks.

The object of the invention is mainly to provide an improvement in roll-machines designed for reducing cereals to threadlike or filament form, and it consists in the novel construction and combinations of parts, as hereinafter set forth.

In the accompanying drawings, the numeral 12, designates the frame of a machine of this character, upon which is seated a hopper 13, below which are located the two reducing rolls 4, and 5, having shafts 6, and 7, respectively, the journal portions of which are seated in bearings of boxes 8, and 9, which are carried by the frame, such other bearings being provided as may be required for other necessary parts of the mechanism.

The rolls are provided with fine circumferential channels, whereby the cooked or otherwise softened grain is reduced to filaments or threads, which are discharged from the channels by means of slender fingers or needles 11, in a continuous manner, upon an endless band or table 10, whereby they are conveyed in more or less parallel arrangement.

Suitable gearing for operating the rolls is indicated at 14. The rolls 4, and 5, are in contact, and their shafts 6, and 7, are parallel and horizontally arranged with reference to each other. The roll 4, is usually arranged to have its journals turned in stationary boxes 8, while the roll 5, has its journals in adjustable boxes 9, these boxes having means of horizontal adjustment 15, whereby the roll 5 may be moved toward or from the other roll, 4. Means, 16, of vertical adjustment are also provided for the boxes 9.

Each reducing roll is provided with a series of small circumferential channels 2, between small circumferential ribs 3, said channels and ribs being usually about the thirtieth of an inch wide and about an eighth of an inch, or less, deep. The ribs are designed to project into the channels of opposite rolls, as indicated.

Each rib is provided with a convex edge, and each channel with a convex bottom, and to this end the lateral edge 17, of each rib is beveled or inclined from the middle portion 18, which is cylindrical. The inclination of these edges may be about forty-five degrees. The bottom of each channel is also made convex, and of similar pattern and dimensions, having inclined edges 19 and a cylindrical middle portion 21. The lateral walls of the channels are vertical, as indicated at 23. The ribs also have vertical side walls 24, and both ribs and channels may be of other convex shape in cross-section, it being designed that the channels shall be deep enough to provide for the engagement of the vertical side walls with the vertical side walls of the ribs. When so engaged by the intercalation of the ribs and channels, the middle convexities of the ribs and channels are in contact, and at each side of the rib is provided a circumferential continuous recess or mold, indicated at 25, whereby, when the rolls are in operation, the cereal material is mashed or pressed into filamentous or threadlike form, of more or less angular shape in cross-section, the two threads or filaments in each channel being separated by the close contact of the middle portions of the ribs and channel bottoms.

In making these rolls it is preferred to employ circular disks of sheet steel, which are placed upon the shafts, and are securely held in position upon each shaft between collars, which are provided with threads to engage threads of a shaft or shaft sleeve, said threads running in opposite directions, to insure firm engagement and compression of the disks against each other. These disks are therefore of the same pattern, having convex edges as above described, but of slightly different diameters, so that the smaller disks will provide the bottoms of the channels, the larger disks forming the ribs and sides of the channels.

Instead of using a single shaft for each reducing roll a very suitable construction may be provided, in the form of a sleeve bearing 35, having oppositely turned interior threads to receive the inner threaded arms of journal pieces 36, each carrying an integral collar 37, which is annularly recessed around the inner arm, as indicated at 38, to receive the end of the sleeve bearing. On this sleeve bearing the disks may be placed and held securely and firmly in position.

The discharging needles or teeth 11, are designed to be set in a transverse head 28, which is secured to the frame at its sides, and between each two needles of each set is provided a separating strip 29, whereby the teeth are kept in proper relative position. The heads or outer ends of the teeth may be connected to, or abut against, a bar 31, which is under tension of springs 32, and in this way they are kept up to their work.

The filaments produced are designed to be of very delicate character, and therefore the circumferential molding channels and ribs are required to have a very precise and careful adjustment, to secure proper action, not only on the material, but also on the channel walls, to avoid undue wear through angular action. Therefore, the boxes of the adjustable roll are provided with adjusting screws 15, to regulate their parallelism, the adjusting screws 16, serving to bring their shafts into the horizontal plane with each other. By means of these rolls each channel provides two filaments, and as each roll is producing filaments, the number of such filaments from a single set of two rolls is quite large, there being usually some forty or fifty channels to a roll. Usually a number of these heads or frames 12, are provided, in line with each other, over the carrier belt, so that the discharged filaments will lie upon each other and form a ribbon of more or less thickness, depending upon the number of filament-forming rolls. This ribbon of filaments may be divided by a transverse cutter into biscuit forms of suitable size, for baking.

I claim:

1. In a roll machine for reducing cereal material, the combination with a moving element having a convex bottom channel between vertical walls, and a rotary roll having a circumferential rib provided with vertical side walls engaging the walls of said channel and a transversely convex circumferential edge engaging the convex bottom of the channel and providing, for the reduced material, a lateral moving moldway between the vertical channel wall and the contact line of the channel bottom with the circumferential rib of the rotary roll.

2. In a roll machine for cereals, a reducing roll having a series of circumferential convex-bottom channels and alternating circumferential convex-edge ribs having lateral vertical walls forming the sides of said channels, each channel providing a re-entrant angular moldway between its lateral wall and the highest portion of its convex bottom.

3. In a roll machine for cereals, a reducing roll comprising a series of removable thin disks, each having plane sides and terminating in a transversely convex edge, and smaller concentric alternating removable disks of substantially equal thickness to said thin disks and having similar plane sides and transversely convex edges, said convex edges forming the bottoms of fine circumferential channels.

4. In a roll machine for cereals, a journal shaft, thereon a series of thin removable reducing disks each having plane sides and terminating in a transversely convex circumferential edge, alternating smaller concentric disks of equal thickness to said reducing disks and having similar transversely convex circumferential edges forming channel-bottoms, a shaft parallel to said journal shaft, and thereon a similar series of similar thin convex-edge reducing disks and similar alternating convex-edge smaller disks forming channel-bottoms.

5. In a roll machine for cereals, parallel shafts having each a roll having circumferential transversely convex-bottom channels, between transversely convex-edge circumferential ribs having vertical side walls bounding said channels, the ribs of one roll entering the channels of the other parallel roll and engaging the side walls and convex bottoms thereof, to provide lateral angular moldways between said side walls and the convex edges of the disks.

6. In a roll machine for cereals, a reducing roll comprising a series of thin disks having vertical plane side walls, a series of concentric alternating disks of smaller diameter and forming the bottoms of circumferential channels between said side walls, right and left threaded sleeve bearings having compression collars for the series of disks, and right and left threaded shaft sections engaging said sleeve bearings.

7. In a machine for reducing cereals, a reducing roller having a series of circumferential grooves having each a lateral circumferential cone-shaped wall and adjacent thereto a vertical circular plane wall, and a cylindrical wall.

In testimony whereof I affix my signature, in presence of two witnesses.

JOHN E. HUTZEN.

Witnesses:
THOMAS CARLIN,
HOWARD JAMES.